Dec. 16, 1958  G. O. FREDRICKSON  2,864,992
VOLTAGE REGULATING APPARATUS
Original Filed Nov. 9, 1954  3 Sheets-Sheet 1

INVENTOR:
Gustav O. Fredrickson

Dec. 16, 1958  G. O. FREDRICKSON  2,864,992
VOLTAGE REGULATING APPARATUS
Original Filed Nov. 9, 1954  3 Sheets-Sheet 2
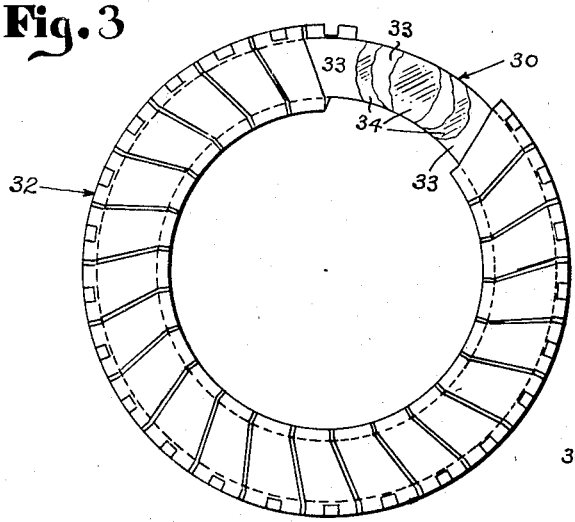
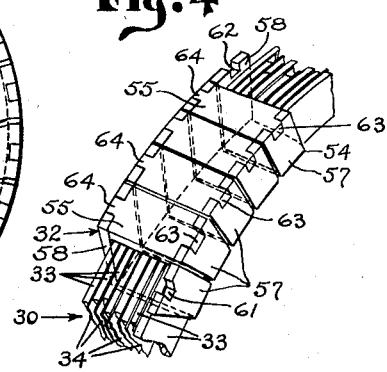
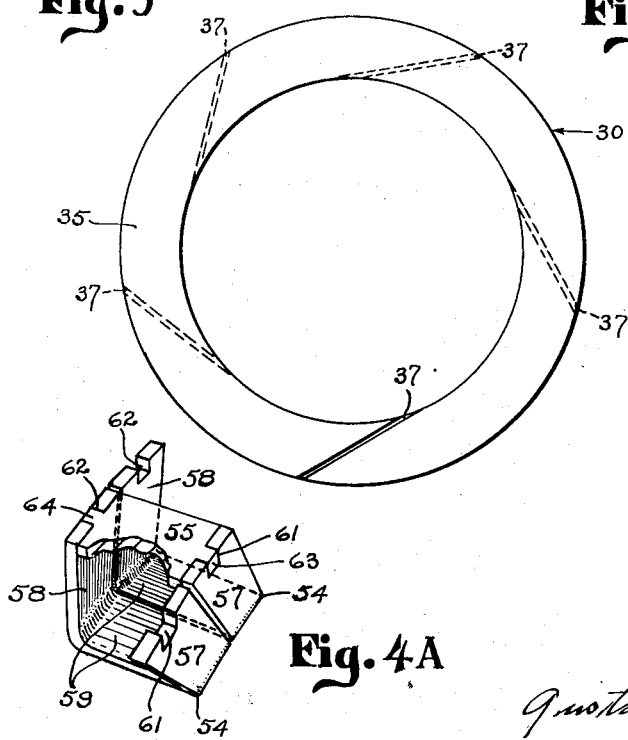
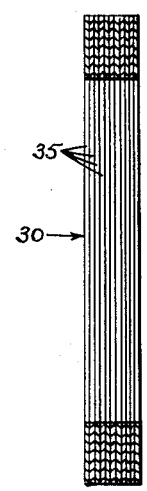
INVENTOR:
Gustav O. Fredrickson.

Dec. 16, 1958 G. O. FREDRICKSON 2,864,992
VOLTAGE REGULATING APPARATUS
Original Filed Nov. 9, 1954 3 Sheets-Sheet 3

INVENTOR:
Gustav O. Fredrickson

United States Patent Office 2,864,992
Patented Dec. 16, 1958

2,864,992

VOLTAGE REGULATING APPARATUS

Gustav O. Fredrickson, Southington, Conn., assignor to The Superior Electric Company, Bristol, Conn., a corporation of Connecticut Continuation of application Serial No. 467,781, November 9, 1954. This application February 11, 1958, Serial No. 714,667

10 Claims. (Cl. 323—47)

This invention relates to voltage regulating apparatus for alternating current, and more particularly to an improved arrangement for regulating voltage in alternating current circuits by minute increments.

The present application is a continuation of my co-pending application S. N. 467,781, filed November 9, 1954, and entitled Voltage Regulating Apparatus, now abandoned.

Heretofore, in variable voltage transformers, it has been common practice to connect portions of a winding in a circuit by moving a brush along the winding. To assure electrical connection at all times, this has necessitated contact of the brush simultaneously with a plurality of turns of this winding, thereby creating a condition of short circuit within the winding causing objectionable heating of the brush and resulting in loss of power and inefficient transformer operation.

In order to reduce the magnitude of this short circuit current, and its consequent objectionable effects, it has been necessary to construct the brush from a very carefully selected material having particular characteristics including high electrical resistivity. Such brushes heat objectionably in use. The electrical resistance of such a brush in connection with the coil, should be as low as possible so that it will not objectionably limit the flow of load current. Hence, even the selection of the particular electrically conductive material for this brush can never be ideal under any condition. In view of this objectionable short circuiting and brush heating, variable voltage devices of this character heretofore have had to be limited to the control of relatively small amounts of power.

It is therefore an object of this invention to provide an improved voltage adjusting device which will handle large amounts of power without objectionable heating, and which will gradually and uniformly vary an output voltage through minute changes.

It is a further object of this invention to provide an adjustable voltage controlling mechanism, especially adapted to handle large electrical loads, having a compact and simple construction; and which will regulate the voltage output by small increments over a wide range.

A still further object of this invention is to provide an efficient and economical alternating current voltage regulating apparatus for precisely controlling an output voltage while maintaining an undistorted wave shape of the voltage to be subdivided.

To these ends, and also to improve generally upon devices of this character, my invention consists in the various matters hereinafter described and claimed. In its broader aspects, the invention is not necessarily limited to the specific arrangements selected for illustrative purposes in the accompanying drawings wherein:

Fig. 3 is a fragmentary end elevation of one of the toroidal windings.

Fig. 4 is a fragmentary perspective view of the toroidal winding and its associated core.

Fig. 4A is a fragmentary perspective illustration of a portion of the toroidal winding.

Figs. 5 and 6 illustrate one form of core for the toroidal winding.

Figure 1:
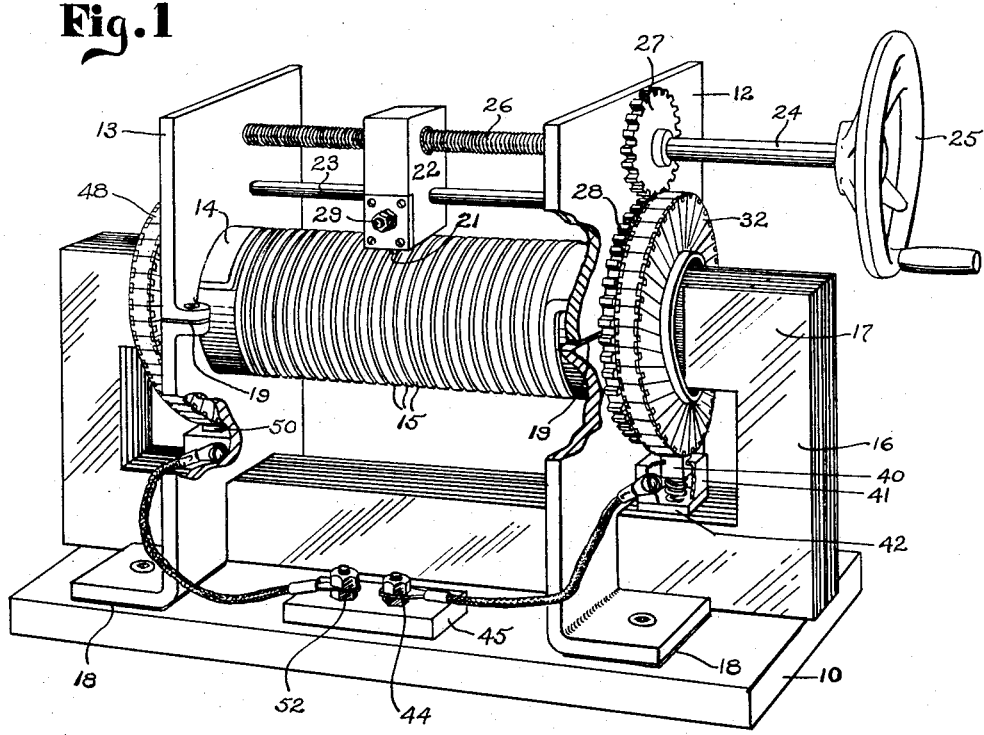
Figure 1 is a perspective side view partly broken away and showing one form of my invention.

Generally considered, my invention embodies a helical coil, wound about a paramagnetic core, wherein a brush may selectively engage any portion of any single turn of the coil, for electrical contact therewith. This invention also includes a closed annulus forming a winding about the paramagnetic core and connected at one point to the helical coil. The annulus may comprise a closed turn of electrically conductive material having a high electrical resistivity or, if desired, it may comprise a closed toroidal winding formed about an annular paramagnetic core which surrounds the first-mentioned core. A brush in slidably movable contact with the annulus or winding makes the desired electrical connection with a selected portion of the annulus or winding. Alternating current is fed into the helical winding and the desired load whose voltage is adjustable is taken off through the brushes, this voltage being precisely controlled by the selected engagement of the brushes with the helical coil and with the annulus.

In the embodiment of my invention, illustrated in Figs. 1 through 4A, a base 10 is fastened to upright frame members 12 and 13 in which are mounted bearings that rotatably support an insulating tube 14 on which is secured a helical coil or winding 15 having adjacent convolutions in uniformly closely spaced relation. A closed ferromagnetic core 16, fastened to the base, has a leg 17 extending longitudinally through the tube 14 and provides a closed magnetic circuit of low reluctance through the length of the winding 15. The frame members 12 and 13 are insulated at 18 from the base 10 and are each made in two parts that are separated by insulating strips 19 so that these frame members will not form a closed electrical circuit about the core. The frame members are secured together as by screws and are similarly secured to the base 10, each of these screws being in insulating relation to one of its connecting members as by insulating washers so that the frame members 12 and 13 do not make a closed electrical circuit.

A brush 21 movably mounted in and electrically insulated from a carrier 22 is yieldably urged into slidable engagement with a short length of a single turn of the winding 15, this brush being arranged for selective electrical contact with the desired portion of any single turn of the winding 15 to regulate the output voltage. A guide rod 23, mounted at its ends in the frame members 12 and 13, slidably supports the carrier 22. A shaft 24, journalled for rotation in the frame members 12 and 13 and turned as by a handwheel 25, has a screw portion 26 between the frame members threaded through the carrier 22. A gear 27, fastened to the shaft 24, meshes with a gear 28 secured to the tube 14. The pitch of the screw portion 26 and the ratio of the gears 27, 28 is such that rotation of the handwheel will simultaneously rotate the winding 15 and progressively advance the brush 21 in continuous contact with this winding to locate the brush in contact with any desired portion of any single turn thereof. Electrical connection is made to the brush 21 through a binding post 29 mounted on and insulated from the brush carrier 22. It will be appreciated, of course, that if desired, the winding 15 may be held stationary and the brush may be revolved thereabout in continuously advancing relation along this winding 15 to selectively contact the desired portion of any one of the turns of this winding.

Surrounding a portion of the core 16, and preferably adjacent to one end of the winding 15, is a substantially closed core 30 of ferromagnetic material about which is wound spaced turns of a closed winding 32. The core 30 may comprise a stack of annular sheet metal stampings 33 of suitable ferromagnetic material with intervening flat discs 34 of thin insulating material. An insulating tape or the like (not shown) is progressively wrapped about the core 30 to insulate it from the toroidal winding 32 formed thereover. In the event that this core 30 has good electrical conductivity, it may be desirable to provide one or more narrow core interruptions which do not materially detract from the magnetic characteristics of the core and which will prevent current flow in this core due to induced voltage. Figs. 5 and 6 show one form of interrupted core wherein flat annular core stampings 35 of suitable ferromagnetic material are each interrupted by a chordally disposed slot 37 cut therethrough, the slots on adjacent stampings being preferably in circumferentially spaced relation. These stampings are axially spaced by intervening thin insulating strips, and an insulating cover insulates the toroidal winding from the core in generally the same manner as explained with respect to the core and the winding 32. However, it will be understood that other paramagnetic materials having good magnetic properties may be employed without requiring such interruptions in the core.

A brush 40, supported in a carrier 41 mounted on a fixed insulating block 42, is spring-urged into continuous wiping contact with a flattened peripheral portion of the toroidal winding 32 to connect selected portions of this winding in a circuit, suitable connection being made by a binding post 44 secured to an insulating block 45 and connected by a cable to the brush. The toroidal winding 32 and its associated annular core are shown mounted on the end of the insulating tube 14 for rotation under control of the handwheel 25 simultaneously with the rotation of the helical winding 15. In my preferred arrangement, I may also mount on the other end of the insulating tube 14 a corresponding toroidal winding 48 formed about an annular core 49 similar to the core 30 and selectively engaged by a spring-urged brush 50, electrically connected to a binding post 52 on the insulating block 45. With this arrangement, the operator may turn the handwheel to simultaneously adjust the brush contacting positions on all windings to gradually and precisely regulate an output voltage through minute increments over a wide voltage range. However, it will be also appreciated that, if desired, the toroidal windings may be located about the core 16 independently of the tube 14 and a relative rotation between each brush and its associated toroidal winding may be accomplished separately from the rotation of the helical winding 15.

Each of the toroidal windings 32 and 48 may comprise a series of generally U-shaped segments 54 progressively interconnected by crossbars 55 to cooperatively form an annularly advancing endless winding having generally rectangularly shaped turns in closely conforming relation about the core therebeneath, these segments and crossbars being shaped from sheet copper or other suitable electrically conductive material. Each segment 54 has a pair of spaced substantially parallel side arms 57 and 58 interconnected at their inner ends by a cross member portion 59. One of the side arms, as 57, is angularly disposed rearwardly with respect to a core radius passing centrally through the portion 59, and the other side arm, as 58, is correspondingly angularly disposed forwardly of the same core radius to provide the required lead for each turn of the winding about the core 30. The outer ends of the arms 57 and 58, which are slightly arcuate in generally concentric relation to the core 30, are respectively provided, intermediate their ends, with transverse grooves 61 and 62. Each crossbar 55 extends between an arm 58 of one segment 54 and the arm 57 of the next segment and has end projections 63 and 64 respectively interfitting within the corresponding grooves 61 and 62. To assure good electrical connection between the segments 54 and crossbars 55, which cooperatively form the endless toroidal winding around the core 30, I preferably solder together the interengaging segments and crossbars. With this arrangement the crossbars 55 of each toroidal winding will serve as commutator segments engaged by the brushes 40, 51 to selectively connect the desired portion of each toroidal winding in the circuit.

Figure 2:
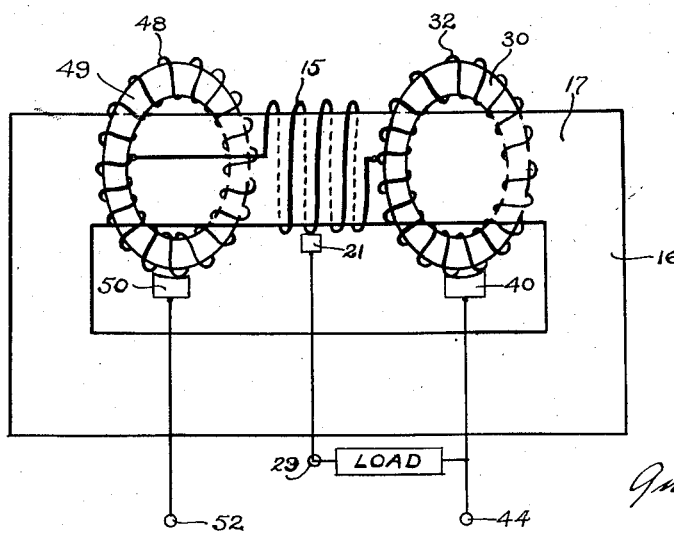
Fig. 2 is a schematic wiring diagram of the embodiment of Fig. 1.

As shown in Fig. 2, the toroidal windings 32 and 48, that are simultaneously rotated with the intermediate helical winding 15, are correspondingly electrically connected to the end portions of the winding 15. Input voltage is applied through the binding posts 44 and 52 and by connecting leads to the brushes 40, 50 thence to the toroidal windings and helical winding 15. Output voltage is taken from one of the binding posts 44 or 52 and from the binding post 29 to energize a suitable load as indicated. All of the turns of each toroidal winding 32 and 48 form a closed circuit about a leg of the main ferromagnetic core 16 and each of these windings has a total voltage induced therein of the same magnitude as the voltage induced in any single turn of the helical winding 15. Circulating current will flow in each winding 32 and 48, which is now limited, not primarily by the resistance of the toroidal winding itself but principally by the exciting reactance of this toroidal winding. With the value of this circulating current through each toroidal winding under precise control, it is no longer necessary to employ a material of carefully selected high resistivity for the brushes which selectively engage the windings. In fact, it has been proved through many tests that brushes of high electrical conductivity are satisfactory in my invention and are free from the previous troubles of objectionable heating even when bridging adjacent turns of my toroidal windings. Consequently my transformer is particularly adpated to be constructed to supply large electrical loads. In view of the fact that the brush 21 selectively engages only a short length of a turn of the winding 15 and since the selective brush contacts with the toroidal winding effectively divide the voltage of a single turn of the winding 15 into many small parts, it will be evident that a gradual change of voltage output may be easily and rapidly effected through minute increments over a wide voltage range.

Figure 7:
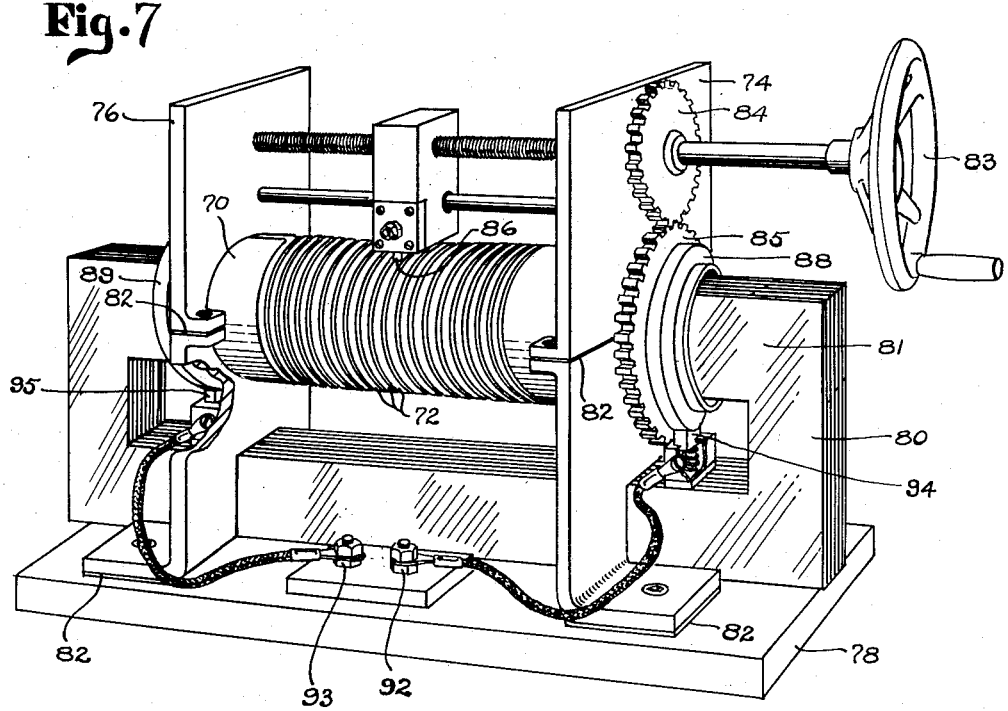
Fig. 7 is a perspective view of another embodiment of the invention.
Figure 8:
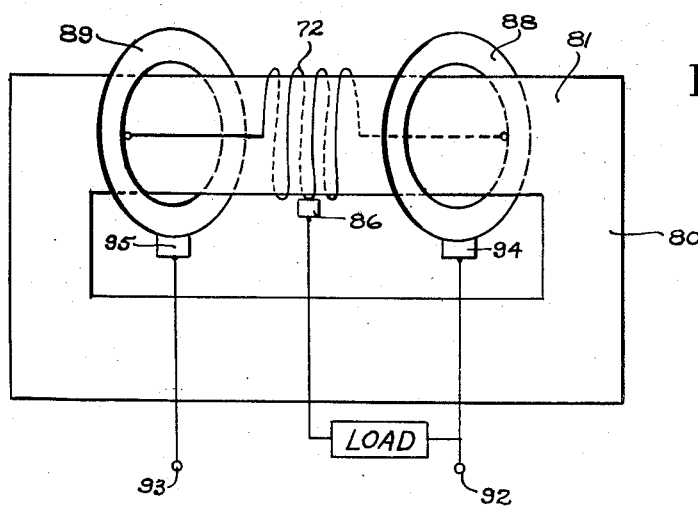
Fig. 8 is a schematic wiring diagram of the embodiment of Fig. 7.

The embodiment of Figs. 7 and 8 is similar to Fig. 1 in that an insulating tube 70, carrying a helical winding 72, is rotatably mounted on end frame members 74 and 76 secured to a base 78 which supports a closed ferromagnetic core 80 having a leg 81 about which the tube 70 and winding 72 rotate. Insulating strips 82 prevent each of the end frame members from making a closed circuit about any portion of the core 80. Also, mounting and securing screws are in insulating relation to one of the engaged frame members to prevent any objectionable closed circuit through a frame member about the core. A handwheel 83 operates through gears 84 and 85 to rotate the tube 70 and winding 72 and at the same time acts through a screw threaded connection to progressively traverse a brush 86 into selective contact with a desired portion of any single turn of this winding in the same manner as previously described with reference to Fig. 1. Respectively mounted on each end of the insulating tube 70 for rotation in unison therewith are similar closed rings 88 and 89 composed of a metal having a selected electrical resistivity. As shown in Fig. 8, the opposite ends of the helical winding 72 are electrically connected to the rings 88 and 89 at locations which are preferably spaced 180 degrees apart. An input voltage is fed through binding posts 92 and 93 and connecting leads to brushes 94 and 95 mounted similarly to the brush 40 and spring-urged respectively against the resistor rings 88 and 89, electrical connection between these rings being made through the helical winding 72. The adjustable output voltage to a suitable load as indicated in Fig. 8, is taken through the binding posts respectively connecting to the brushes 86 and 94. The rings 88 and 89 are constructed to have an inherent electrical resistance which limits the circulating current due to the voltage induced therein by their linkage of the alternating magnetic flux within the core 80. However, these rings have sufficient conductivity to carry the load current of the winding 72 without appreciably restricting current flow to the load. It will be appreciated that each of the single turn resistor rings 88 and 89 will have a voltage induced therein of the same magnitude as that of the voltage in a single turn of the winding 72, and the rotation of these rings in contact with their respective brushes will gradually effect small voltage changes. Hence, under control of the handwheel 83 which simultaneously changes all brush contacting positions a voltage adjustment may be accurately made through minute changes over a wide voltage range.

Variations and modifications may be made within the scope of the claims and portions of the improvements may be used without others.

I claim:

1. An adjustable voltage control device comprising an autotransformer having a helical winding, a paramagnetic core extending through the winding, a brush engageable with part of a turn on the winding and in slidable electrical contact therewith for movement throughout substantially the entire length of the winding, a pair of closed windings about the core and in spaced relation to the helical winding, a pair of brushes in slidable contact respectively with each closed winding, a tap on each closed winding, the helical winding being in electrical series connection with said taps, an input circuit including the brushes on the closed windings, and an output circuit including the brush on the helical winding and one of the other brushes.

2. An adjustable autotransformer comprising a helical winding about a portion of a ferromagnetic core and electrically insulated therefrom, a brush slidably engageable with a portion of a turn on said winding and movable in continuous engagement with the winding throughout substantially the entire length of the winding, a second ferromagnetic core surrounding said first-mentioned core in spaced relation, a first closed toroidal winding wound completely around the last-mentioned core and having a bared conducting surface formed by a portion of the winding, a tap electrically connected to one of the turns of the first toroidal winding and electrically connected to an end of the helical winding, a second brush in movable electrical contact with a short length of the first toroidal winding and slidingly engaging said conducting surface to be in continuous electrical contact therewith, a third ferromagnetic core surrounding said first mentioned core in spaced relation, a second closed toroidal winding wound completely around the third core and having a bared conducting surface formed by a portion of the winding, another tap electrically connected to one of the turns of the second toroidal winding and electrically connected to the other end of the helical winding, a third brush in movable electrical contact with a short length of the second toroidal winding and slidingly engaging its conducting surface to be in continuous electrical contact therewith, a pair of input leads connected to the second and third brushes and output leads connected to the first brush and one of the other brushes, and mechanism to simultaneously and uniformly traverse all brushes along their respective windings to regulate the output voltage through minute increments.

3. A voltage adjusting device comprising an autotransformer having a winding about a portion of a ferromagnetic core, a brush slidably engageable with a short length of said winding, a pair of toroidal closed windings in spaced relation to each other and surrounding a leg of said core, an annular ferromagnetic core in each toroidal winding, a pair of brushes respectively in slidable engagement with said toroidal windings, a turn of each toroidal winding being electrically connected respectively to the ends of the first-mentioned winding, an input circuit including said pair of bruhses, an output circuit including said first-mentioned brush and one of said pair of brushes, and mechanism to move each of said brushes along its associated winding to uniformly vary the output voltage.

4. A voltage adjusting device comprising an autotransformer having a helical winding wound about a leg of a ferromagnetic core, an annular ferromagnetic core adjacent each end of the helical winding and surrounding said leg in spaced relation, a closed toroidal winding about each annular core, a tap on a turn of each toroidal winding electrically connected respectively to the adjacent end of the helical winding, brushes respectively in slidable engagement with a turn of each winding, input leads connected to two of said brushes and output leads connected to the third brush and one of the other two brushes, and mechanism to rotate each of the windings and to simultaneously traverse each brush through small increments and throughout substantially the entire length of its associated winding, to selectively connect desired portions of each winding in a circuit.

5. An adjustable voltage control device comprising an autotransformer having a helical winding, a paramagnetic core extending through the winding, a brush engageable with part of a turn on the winding and in slidable electrical contact therewith for movement throughout substantially the entire length of the winding, a pair of closed windings about the core and in spaced relation to the helical winding, each of said closed windings being an annular ring of material having an electrical resistance which limits to a safe value the circulating current induced thereby flux in the core, a pair of brushes in slidable contact respectively with each closed winding, a tap on each closed winding, the helical winding being in electrical series connection with said taps, an input circuit including the brushes on the closed windings, and an output circuit including the brush on the helical winding and one of the other brushes.

6. A variable autotransformer having a magnetic core, two elements one of which is mounted for rotation relative to the other, one of said elements comprising a wire coil through which the core extends and the other element comprising a brush which engages the coil so that relative rotation of said elements causes the brush to continuously engage successive portions of the coil, and conducting means for supplying input energy to the coil and removing an adjustable output energy, said conducting means including means for supplying energizing current to the coil, a closed winding encircling the core, a second brush in electrical contact with the closed winding and relatively movable thereon with respect thereto, and means including the first mentioned brush and a portion of the means supplying input energy current to the coil for conducting the output energy from the autotransformer.

7. A variable autotransformer having a magnetic core, two elements one of which is mounted for rotation relative to the other, one of said elements comprising a wire coil through which the core extends and the other element comprising a brush which engages the coil so that relative rotation of said elements causes the brush to continuously engage successive portions of the coil, and conducting means for supplying input energy to the coil and removing an adjustable output energy, said conducting means including means for supplying input energizing current to the coil, an annular magnetic core encircling a portion of the first core, a closed toroidal winding on the annular core, a second brush in electrical contact with the toroidal winding and relatively movable thereon with respect thereto, and means including the first mentioned brush and a portion of the means supplying input energy current to the coil for conducting the output energy from the autotransformer.

8. An adjustable autotransformer comprising a helical winding, a paramagnetic core extending through the winding, a first brush engageable with part of a turn on the winding and in slidable electrical contact therewith, means for relatively moving the brush and winding for causing the brush to move through substantially the length of the winding, a closed winding encircling a portion of the core and in spaced relation to the helical winding, a second brush in slidable contact with the closed winding and relatively movable thereto, a tap on the closed winding, a pair of input terminals, a pair of output terminals, one of each of said terminals being electrically common, first connecting means electrically connecting the other input terminal to one end of the coil and second connecting means electrically connecting the other output terminal to the first brush, said closed winding, tap and second brush being included in one of said connecting means.

9. An adjustable autotransformer comprising a helical winding, a paramagnetic core extending through the winding, a first brush engageable with part of a turn on the winding and in slidable electrical contact therewith, means for relatively moving the brush and winding for causing the brush to move through substantially the length of the winding, a closed winding comprising an annular magnetic core and a closed toroidal winding wound on the core mounted in spaced relation to the helical winding and encircling a portion of the paramagnetic core, a second brush in slidable contact with the toroidal winding and relatively movable thereto, a tap on the closed winding, a pair of input terminals, a pair of output terminals, one of each of said terminals being electrically common, first connecting means electrically connecting the other input terminal to one end of the coil and second connecting means electrically connecting the other output terminal to the first brush, said closed winding, tap and second brush being included in one of said connecting means.

10. An adjustable autotransformer comprising a helical winding, a paramagnetic core extending through the winding, a first brush engageable with part of a turn on the winding and in slidable electrical contact therewith, means for relatively moving the brush and winding for causing the brush to move through substantially the length of the winding, a closed winding encircling a portion of the core and in spaced relation to the helical winding, said closed winding consisting of an annular ring of material having an electrical resistance which limits to a safe value the circulating current induced therein by the flux in the core, a second brush in slidable contact with the closed winding and relatively movable thereto, a tap on the closed winding, a pair of input terminals, a pair of output terminals, one of each of said terminals being electrically common, first connecting means electrically connecting the other input terminal to one end of the coil and second connecting means electrically connecting the other output terminal to the first brush, said closed winding, tap and second brush being included in one of said connecting means.

No references cited.